US004001672B2

United States Statutory Invention Registration [19]

[11] Reg. Number: H1672

Hermans et al.

[45] Published: Aug. 5, 1997

[54] TISSUE PRODUCTS MADE FROM LOW-COARSENESS FIBERS

[75] Inventors: Michael Alan Hermans, Neenah; Robert Dale Sauer, Fremont; Shafi Ul Hossain, Menasha; John Dennis Litvay, Appleton, all of Wis.

[73] Assignee: Kimberly-Clark Corporation, Neenah, Wis.

[21] Appl. No.: 862,876

[22] Filed: Apr. 3, 1992

Related U.S. Application Data

[63] Continuation-in-part of Ser. No. 173,959, Mar. 28, 1988, abandoned.

[51] Int. Cl.[6] ..... D21F 11/00

[52] U.S. Cl. ..... 162/148

[58] Field of Search ..... 162/99, 141, 142, 162/148, 150, 149, 91, 111, 112, 113

[56] References Cited

U.S. PATENT DOCUMENTS

| | | | |
|---|---|---|---|
| 367,215 | 7/1887 | Kohn | 162/99 |
| 1,006,142 | 10/1911 | Stark | 162/99 |
| 1,511,664 | 10/1924 | Drewsen | 162/97 |
| 1,534,236 | 4/1925 | Markoczi et al. | 162/97 |
| 1,918,558 | 7/1933 | Plant | 162/99 |
| 2,045,096 | 6/1936 | Osborne | 162/99 |
| 2,056,185 | 10/1936 | Greene | 162/99 |
| 2,778,749 | 1/1957 | Bainbridge et al. | 162/158 |
| 3,620,911 | 11/1971 | Eklund | 162/97 |
| 4,300,981 | 11/1981 | Carstens | 162/111 |
| 4,447,294 | 5/1984 | Osborn | 162/112 |
| 4,464,224 | 8/1984 | Matolcsy | 162/142 |
| 4,959,125 | 9/1990 | Spendel | 162/112 |

FOREIGN PATENT DOCUMENTS

| | | | |
|---|---|---|---|
| 222605 | 11/1957 | Australia | 162/99 |
| 0199481 | 10/1986 | European Pat. Off. | 162/91 |
| 53-52702 | 5/1978 | Japan | 162/99 |

OTHER PUBLICATIONS

Nieschlag et al, "A Search for New Fiber Crops II. Analytical Evaluations, Continued," *TAPPI*, Dec. 1960, vol. 43, No. 12, pp. 993–998.

Neish, "Milkweed", *Journal Soc. Chem. Ind.*, Jan. 31, 1913, vol. 32, No. 2, pp. 72 & 73.

Battista, *Synthetic Fibers in Papermaking*, John Wiley & Sons, (1964) pp. 63 and 64.

*Primary Examiner*—Charles T. Jordan
*Assistant Examiner*—Meena Chelliah
*Attorney, Agent, or Firm*—Gregory E. Croft

[57] ABSTRACT

Tissue products made with fibers having a low Coarseness Index have improved softness relative to tissue products made with conventional papermaking fibers.

10 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TISSUE PRODUCTS MADE FROM LOW-COARSENESS FIBERS

This application is a continuation-in-part of U.S. patent application Ser. No. 07/173,959 filed Mar. 28, 1988 now abandoned.

BACKGROUND OF THE INVENTION

In the manufacture of tissue products, such as facial tissue and bath tissue, continual attention has been given to ways to improve softness of the product as perceived by the consumer. For example, it has long been known that the use of fibers from certain species of hardwoods, such as eucalyptus, improves the perceived softness of tissue products and such fibers have been incorporated into commercially available products for years. Other efforts to improve softness have focused on the creping step and the attendant adhesion of the uncreped web to the creping cylinder. Layering has also received considerable attention, particularly by placing the eucalyptus fibers in the outer layers to maximize the tactile response. All of these approaches have their place in improving the perceived softness of tissue products, but there are other factors to consider which, until now, have not been fully appreciated.

SUMMARY OF THE INVENTION

It has now been discovered that a key to achieving softness in tissue products lies in the Coarseness Index of the species of fibers used to form the sheet or, viewed another way, the Coarseness Index of the fibers of the furnish used to form the sheet when a mixture of fiber species is used. The Coarseness Index of conventional softwood fibers ranges from about 11 to about 20. The Coarseness Index of conventional hardwood fibers also varies considerably, eucalyptus being about 8 and northern hardwood kraft fibers being about 12. However, by substituting lower-coarseness fibers for one or more fiber species of a conventional tissue making furnish, the softness of the resulting product can be improved compared to the same product made the same way but without the lower coarseness fibers.

For purposes herein, improvements in tissue softness can be expressed in terms of a panel softness number, the Tensile/Modulus Ratio, which will hereinafter be described, or Profile Index, which will also be hereinafter described. The Tensile/Modulus Ratio and the Profile Index are advantageous for assessing softness improvements in that they are objective measurements as compared to a panel softness evaluation, which is subjective. It must be kept in mind, however, that perceived softness is comprised of many different factors, not all of which are accounted for by any single objective test. Nevertheless it has been found that the two major influences on perceived softness are stiffness and surface depth. The Tensile/Modulus Ratio is a measurement of the stiffness of the tissue and the Profile Index is a measure of the surface depth. Therefore both of these objective measurements can be used in the appropriate circumstances to be indicative of softness improvements.

Furthermore, the softness improvements imparted by this invention can be achieved without any loss of strength (after correction to constant tensile strength either mathematically or by manipulation of furnish or processing). In all aspects of this invention, the tissue product can have a geometric mean tensile strength of about 500 grams or greater and an increased Tensile/Modulus Ratio or an increased Profile Index compared to the same tissue product without any of the low-coarseness fiber species described. In addition, the absorbent capacity of the tissue products made with certain lower-coarseness fibers, such as milkweed seed floss fibers, can surprisingly be increased compared to the same tissue product made without the lower coarseness fibers.

Hence, in one aspect the invention resides in a tissue product comprising from about 5 to about 50 dry weight percent fibers of a nonwoody species having an average Coarseness Index of 9.0 or less, preferably 8.0 or less, and most preferably 7.0 or less.

In another aspect, the invention resides in a tissue product formed from a fiber furnish having a Furnish Coarseness Index of 7.5 or less, preferably 7.0 or less.

In another aspect, the invention resides in a tissue product comprising first and second fiber species, wherein the first fiber species has an average fiber length greater than 1 millimeter (long fiber) and a second fiber species has an average fiber length less than 1 millimeter (short fiber), and wherein the first fiber species has a Coarseness Index of 10 or less, preferably 9 or less, and most preferably 8 or less.

In another aspect, the invention resides in a tissue product comprising first and second fiber species, wherein the first fiber species has an average fiber length greater than 1 millimeter and the second fiber species has an average fiber length less than 1 millimeter, and wherein the second fiber species has a Coarseness Index of 7 or less.

In another aspect, the invention resides in a tissue product comprising fibers of at least two different fiber species, wherein a first fiber species has an average fiber length greater than 1 millimeter and a second fiber species has an average fiber length less than 1 millimeter, wherein the first fiber species has a Coarseness Index of 10 or less and the second fiber species has a Coarseness Index of 7 or less.

In another aspect, the invention resides in a tissue product comprising a fibrous sheet having first and second layers, said first layer being the outer surface of the tissue product, said first layer comprising at least about 5 dry weight percent fibers of a nonwoody species having an average Coarseness Index of about 7.5 or less, preferably about 7.0 or less. When forming layered tissue sheets, it is advantageous to incorporate the softness properties of the low-coarseness fibers in the outer layers of the tissue product. The low-coarseness fibers in the outer (first) layer can have an average fiber length of about 1.5 millimeters or greater. Especially suitable fibers for this purpose are milkweed seed floss fibers, which provide significant improvements in surface depth. Other low-coarseness fibers, including low-coarseness fibers having an average fiber length of about 1.5 millimeter or greater, can be used in any layer, including the inner layers, to improve (lessen) the stiffness of the sheet. The net result is improved softness at constant tensile strength by two different mechanisms (surface depth and stiffness). The low-coarseness fibers in the outer layer can have a fiber length of about 1.5 millimeter or greater.

Those skilled in the art of making tissue will appreciate that there are many other factors which influence tissue softness besides the Coarseness Index, including fiber length, fiber bonding, fiber collapse, fiber chemistry, creping, etc. However, Coarseness Index has been discovered to be a dominant factor among fiber characteristics. In all aspects of this invention, it is preferable that the fibers have a numerical average fiber length of less than 6 millimeters, most preferably less than 4 millimeters, as it has been found that longer fibers cause unacceptably poor formation using conventional forming apparatus.

For purposes herein, "tissue product" means a product having one or more fibrous sheets, preferably creped, each sheet having a dry basis weight of from about 5 to about 40 pounds per 2880 square feet, preferably from about 5 to about 25 pounds per 2880 square feet, and most preferably from about 5 to about 10 pounds per 2880 square feet. Bulk densities for tissue products are typically less than about 0.2 grams per cubic centimeter and often are less than about 0.15 grams per cubic centimeter. The fibrous sheets can be layered or not layered (blended). For layered sheets, it is preferable to provide an outer layer, which is the outwardly facing surface of the tissue product, with a long low-coarseness fiber such as milkweed seed floss fibers to impart a softness resulting from significant surface depth, and provide an inner layer with fibers which can provide strength, such as softwood fibers, or other low-coarseness fibers which provide improved tensile/modulus ratios, such as abaca fibers, pineapple fibers, and synthetic fibers. Products such as facial tissue, bath tissue, paper towels, and dinner napkins are specific examples of tissue products within the meaning of this invention, including single-ply, two-ply, three-ply or other multiple-ply forms.

The Coarseness Index for any given species of fiber or any fiber furnish is the weight per unit length of fiber (e.g. milligrams per 100 meters) and is defined as follows:

$$\text{Coarseness Index} = \frac{100}{(F/G)(L)}$$

wherein (F/G)=millions of fibers per gram of fiber; and (L)=the numerical average length of the fibers in millimeters.

For purposes herein, the "Furnish Coarseness Index" is the Coarseness Index of the furnish used to produce a particular tissue product in accordance with the foregoing formula. It is useful when two or more fiber species are used to make up the furnish. It should be noted that the proper value for the Furnish Coarseness Index is not simply the weighted averages of the Coarseness Indices of the individual fiber species of the furnish. Instead, the Furnish Coarseness Index is calculated in accordance with the following formula:

$$\frac{100}{\dfrac{\text{weight \% component \#1}}{\text{Coarseness Index of component \#1}} + \dfrac{\text{weight \% component \#2}}{\text{Coarseness Index of component \#2}} + \ldots}$$

For example, if two fiber species are blended in equal weight percent amounts (50 weight percent) with one fiber species having a Coarseness Index of 11.2 and the other fiber species having a Coarseness Index of 7.8, the Furnish Coarseness Index of the blend is calculated to be 9.2 as follows:

$$\frac{100}{\dfrac{50}{11.2} + \dfrac{50}{7.8}} = 9.2$$

Measuring the Coarseness Index for a given fiber species can yield different values depending upon the measurement method. The traditional method (direct weighing) involves microscopic selection and measuring the length of the selected fibers followed by weighing the known fiber or fibers using a quartz torsion ultramicrobalance. This method is tedious and is generally biased toward measuring the coarseness of true fibers as opposed to other non-fibrous elements and debris which are commonly present in many natural fiber samples. In such cases, the Coarseness value is not realistically representative of the actual material being used to manufacture the tissue product.

Unless otherwise indicated, the Coarseness Index values reported herein were obtained by using a Kajaani Model FS-100 fiber analyzer commercially available from Kajaani Inc. Automation, Atlanta, Ga. For a given sample, the FS-100 measures the number of fibers and other elements present and their average length. With these measurements, and knowing the weight of the sample (0.001 grams air dry), the Coarseness Index can be readily calculated. A more advanced instrument, the model FS-200, automatically calculates the Coarseness Index, eliminating the need for manual calculation. Either of these two instruments or their equivalents can be used for measuring the Coarseness Index for purposes herein, although the Coarseness Index values from each may be slightly different in some instances. These instruments do not discriminate between fibers and other particles in the sample. All particles are counted and measured. Limited experience to date has shown Coarseness Index values obtained using the Kajaani instruments to be about 35 percent lower than those values obtained by using the traditional direct weighing method. For example, the Coarseness Index of abaca leaf fibers was found to be 8.5 via the Kajaani FS-100 versus a value of 11.2 by direct weighing. Similarly, the Coarseness Index for a rayon synthetic fiber was measured to be 11.5 via the Kajaani FS-100 versus 16 by direct weighing.

When using the FS-100, sample preparation was conducted by initially calculating and weighing out a sample to yield approximately 10 oven-dried grams of the material being tested. The sample was diluted to a consistency of 1.67 percent and dispersed at the slowest speed of an Osterizer household blender for 30 seconds. The blended slurry was poured into a plastic container, rinsing the blender well, and diluted to 8000 milliliters using distilled water. The consistency of the diluted slurry was calculated and the amount of the slurry required to give 1.00 grams of oven-dried fiber was determined. This amount of sample was poured into a one liter graduate. To this was added distilled water to bring the total volume to 1000 milliliters (consistency equalled 0.001 grams per cubic centimeter). This sample was then poured into a two-liter beaker. Using a magnetic stirring bar, the diluted slurry was gently agitated while withdrawing a 25 milliliter sample with a pipette. The 25 milliliter sample was transferred to a 250 milliliter graduate, the pipette was rinsed, and the sample further diluted to 250 milliliters with distilled water. The distilled sample was then placed in a 600 milliliter beaker. Again using a magnetic stirring bar, the slurry was gently agitated while withdrawing a 10 milliliter sample with a pipette. The 10 milliliter sample was transferred to a 100 milliliter beaker and the pipette contents were rinsed into the beaker with distilled water. This was the sample introduced into the FS-100. It contained 0.001 grams of fiber. When making the measurement, it is essential to count every fiber or other particulates in the sample. Hence the beaker containing the sample was rinsed into the capillary funnel of the FS-100 three times. For each sample, three specimens were tested and their average values were used in the Coarseness Index calculations.

It will be appreciated that not all fibers are wetable and hence some modification to the standard procedure may be necessary to measure the Coarseness Index of such fibers. For example, it may be necessary to treat the surface of the fibers with a surfactant in order to render them sufficiently wetable to be slurried with water. Alternatively, some fibers such as polyesters can be measured by using denatured alcohol instead of water as the vehicle for preparing the sample. In addition, more dilute samples may be necessary. Those familiar with the operation of the Kajaani FS-100 will appreciate the need for departing from the standard procedure from time to time depending upon the nature of the particular fiber being measured.

To fully understand the meaning of the Coarseness Index, it is important to distinguish coarseness from slenderness, which is a different parameter. Fiber slenderness is the ratio of fiber length to fiber diameter. This concept does not take into account the density of the fiber material or the thickness of the fiber wall for hollow fibers. Hence two fibers of the same length and outside diameter, but differing in wall thickness, will have the same slenderness but different coarsenesses. At the same time, a very long fiber having a thick diameter may have a high slenderness but may also have a high coarseness. The difference between coarseness and slenderness can be significant and can be the difference between a soft sheet and a stiff sheet. It is also important to note that coarseness is not directly a function of fiber length. A fiber having a given Coarseness Index will still have the same Coarseness Index after being shortened because the fibers per gram of fiber will be increased in the same proportion as the length reduction, thereby netting no change. This of course is not the case with slenderness, in which case the slenderness of the fiber is reduced in proportion to the length reduction.

Fiber species having an average Coarseness Index below 9.0 and useful for purposes of this invention include natural fibers, synthetic fibers and combinations thereof. As used herein, "species" is a term to be broadly interpreted to designate a source of fiber which is different from other fiber sources. It can be a plant species, a particular part of a plant species, such as the leaves, or a chemical species. A nonwoody fiber species is any fiber species, including synthetics, that is not a woody plant species. To distinguish woody from nonwoody plants, there are four criteria: (1) Woody plants must be vascular plants; i.e., they must possess specialized conducting tissues consisting of xylem (wood) and phloem (inner bark). The xylem is lignified and is the wood of the mature plant. Plants devoid of vascular tissue cannot produce wood. (2) Woody plants must be perennial plants; i.e., they must live for a number of years. (3) Woody plants must possess a stem that persists from year to year. Many perennials fail to be classed as woody plants because their stems die back to the ground each autumn, the roots persisting through the winter and producing a new stem the following spring. Some plants possess persistent creeping stems and hence fall into the category of woody plants, even though they appear to be herbaceous. (4) Typical woody plants, which include all the commercially important timber trees, exhibit secondary thickening; i.e., they have a means of thickening their stems by subsequent growth in diameter, not traceable to terminal growing points. This is achieved through the activities of a growing layer, called cambium, which is situated just outside the last-formed layer of wood and beneath the inner bark (phloem); new wood and new phloem are thus produced yearly and are developed between the previously formed wood and bark.

Preferred natural fibers within the scope of this invention (average fiber lengths in millimeters in parenthesis) include, without limitation, seed hair fibers from milkweed and related species, abaca leaf fiber (2.87)(also known as Manila hemp), pineapple leaf fibers (0.82), sabai grass (0.57), esparto grass (0.55), rice straw (0.40), banana leaf fiber (1.25), and bast (bark) fibers from paper mulberry (0.42). Suitable synthetic fibers include rayons, acrylics, polyesters, acetates, and polyolefins of suitable coarseness. It is within the scope of this invention to provide tissue products that comprise mixtures of one or more low-Coarseness Index fibers, such as combining milkweed seed floss fibers with abaca fibers to achieve high surface depth (Profile Index) and improved stiffness (Tensile/Modulus Ratio).

The amount of low-coarseness fibers (fibers having an average Coarseness Index of about 9.0 or less) which can be utilized to make a tissue product can be any amount depending upon the fiber cost and the formation characteristics of the resulting furnish. In many instances, the amount can be about 5 dry weight percent or more, more specifically from about 5 to about 50 dry weight percent, more specifically from about 5 to about 30 dry weight percent, and still more specifically from about 5 to about 15 dry weight percent. The amount of low coarseness fibers can be concentrated in the outer layers of the tissue product by forming the tissue with a layered headbox, in which up to 100 dry weight percent of the outer layer can be made up of the low coarseness fibers, even though the percentage amount is significantly less in terms of the entire tissue product weight.

DETAILED DESCRIPTION OF THE INVENTION

Figure 1A:
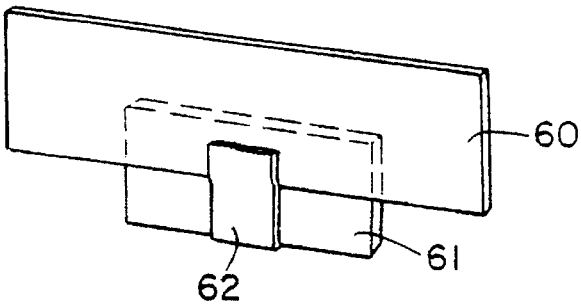
FIGS. 1A, 1B, 1C, 1D, 2, 3, and 4 all pertain to the determination of the Profile Index and are described below in connection with the description of the Profile Index.
Figure 1B:
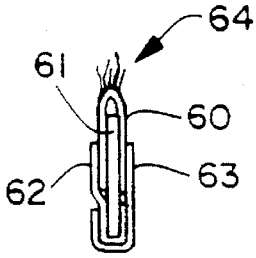

Before describing specific examples of the products of this invention, it is appropriate to first briefly describe the means by which softness values have been determined for illustrating the benefits of the products of this invention. It is emphasized that the softness values reported herein are only intended for comparing softness relative to other samples within a particular experiment and are not to be interpreted as absolute values. Those skilled in the art will appreciate that there are other methods of assessing relative softness values, including objective testing of certain properties such as the ratio of the tensile strength to the specific modulus or the surface depth of the tissue or, ultimately, consumer testing. In some of the Tables set forth herein, the ratio of tensile strength to the specific modulus (Tensile/Modulus Ratio) has been used as an indication of softness where sensory panel softness was lacking. Although the Tensile/Modulus Ratio is a reliable indicator for softness in most instances, it does not hold in the case of milkweed seed floss fibers because the addition of milkweed fibers significantly increases the caliper of the tissue, thereby increasing the stiffness (specific modulus). The substantial and surprising impact of milkweed seed floss fibers on softness is instead attributable to the large increase in the surface depth of the tissue as measured by the Profile Index hereinafter defined.

For purposes herein, product softness was determined by a trained sensory panel. Each panelist had been trained to feel and compare each test sample against multiple standards for each one of three characteristics: stiffness, surface depth, and abrasiveness. The test sample received a numerical rating for each of the three characteristics, and the numerical ratings were factored into a formula which yielded a softness number for the test sample. Softness numbers generally run from 1 to about 12, although higher and lower (including negative values) are possible. The higher values reflect greater softness and lower values correspondingly reflect lower softness. (The 95 percent confidence interval is about ±0.5 softness points.) Directional changes in the softness numbers generated by the sensory panel correlate with consumer preferences in actual consumer testing, i.e. a tissue having a sensory panel softness value of 8 would be preferred for softness by actual consumers when compared to another sample having a sensory panel softness of 6.

Tensile strengths and specific modulus were measured using an Instron Model 1130, including a recorder and Microcon II along with Modulus and Yield Option and stackable speed reducer, available from Instron Corporation, Canton, Mass., or a Sintech 2, available from MTS Sintech, Eden Prairie, Minn., with an IBM PC. Tensile strengths are expressed in grams. Specific modulus values (also referred to herein as "modulus") are expressed as kilometers and are calculated according to the following formula:

$$\text{Specific Modulus} = \frac{\text{Elastic Modulus} \times \textit{TMI}\ \text{Bulk Thickness} \times 150.04}{\text{Basis Weight}}$$

wherein

Specific Modulus is expressed as kilometers;

Elastic Modulus is expressed as kilograms per square centimeter;

TMI Bulk Thickness is expressed as inches; and

Basis Weight is expressed as pounds per 2880 square feet.

For tissue sheets, elastic modulus values, expressed as kilograms per square centimeter, were calculated from slope readings taken between 50 and 100 grams and between 100 and 200 grams on the stress/strain curve, with the higher of the two values being reported. For handsheets, the two readings were taken between 100 and 200 grams and between 400 and 500 grams because of the higher tensile strengths.

Absorbency (absorbent capacity) of tissues for purposes herein is determined by measuring the amount of water absorbed by the tissue after being placed flat on the surface of a water bath at 30° C. and allowed to fully wet out over its entire surface. More specifically, the absorbency can be determined by first weighing a tissue specimen to be evaluated. This is recorded as $W_1$. A wire basket constructed of standard grade reinforced stainless steel wire cloth, used to contain the sample during testing, is lowered into the water bath to fully wet the basket. The basket is approximately 5.5 inches×5.5 inches×1.5 inches (140 mm.×140 mm.×38 mm.) and has a wire diameter of 0.0055 inch, an 80×80 mesh, and a 31.4 percent open area. The basket is removed from the bath and allowed to drain for exactly 30 seconds. The wet basket is placed on a pan scale and weighed to determine the combined weight of the basket and the amount of water adhered to the basket during the procedure. This weight is recorded as $W_2$. The wire basket is then placed into the water bath again and the tissue test specimen is placed onto the surface of the water bath above the wire basket. The tissue is allowed to wet out over its entire surface. The basket containing the tissue sample is removed from the water bath and allowed to drain for exactly 30 seconds. The drained basket containing the sample is placed onto a pan scale and weighed. This weight is recorded as $W_3$. The absorbency, expressed as grams of water per gram of tissue, is determined by the following formula:

$$(W_3-W_2-W_1)/W_1$$

The Profile Index is a measure of the degree of surface irregularity present in the form of protruding fibers and fiber structures. As such it is indicative of the surface depth or cushioniness of the tissue and hence the softness. More specifically, the Profile Index is an index that quantifies the imaged silhouette of fibrous material protruding from the x-y plane of a tissue sample.

The Profile Index is measured using a digital image analyzer. The use of the Model Q-10 image analyzer, previously sold by Olympus Corporation, Lake Success, N.Y., in conjunction with Cambridge Instrument Corporation, Cambridge, England, is described herein, although other image analyzers can also be adapted to measure the Profile Index. The Q-10 digitizes a video image into a 512 (horizontal) by 480 (vertical) pixel display. The Q-10 has a 6 bit analog/digital converter which permits the brightness of each pixel to be resolved into 64 discrete shades of gray. Input to the Q-10 is a Dage Series 65 monochrome video camera utilizing an RS-170 output. This camera uses a vidicon sensing tube and is operated with automatic gain, pedestal and target voltage adjustments. The camera has a resolution of greater than 250 line pairs. The Q-10 is also equipped with an optional shading corrector.

The video camera is mounted on an Olympus BHS microscope with a stereo viewing port. The measurement is made with a 4X objective and a 3.3X intermediate lens such that the field size is approximately 2.6 millimeters wide and 2.4 millimeters high when the signal is digitized by the Q-10 into 512×480 pixels.

When measuring the Profile Index, samples are illuminated in a transmission mode with a semi-diffused light source obtained by placing a diffuser directly on the microscope illumination collimator lens. For ease of use, a clear glass stage is used to set prepared samples. The Olympus microscope uses an electronic stage controlled by a joystick. The auto-stage is not essential to the measurement, but it does allow more rapid specimen positioning and testing.

Figure 1C:
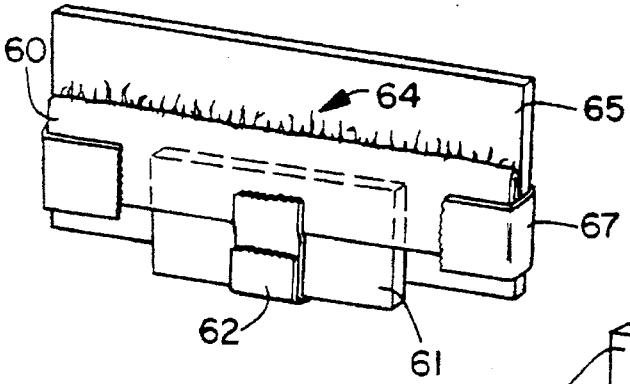
Figure 1D:
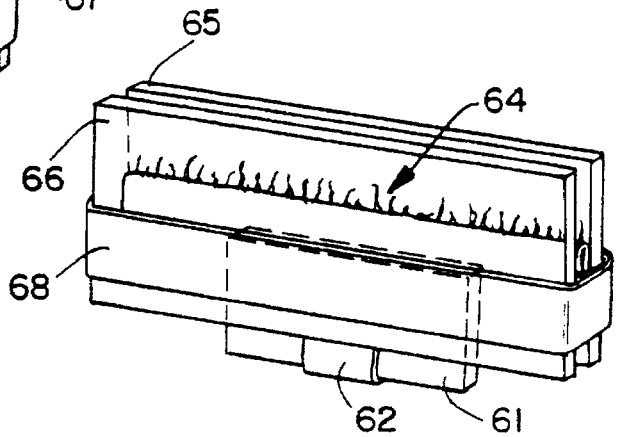
Figure 2:
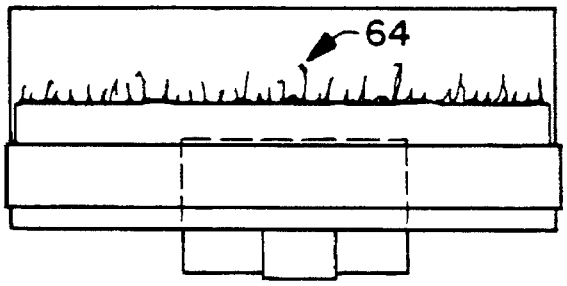
Figure 3:
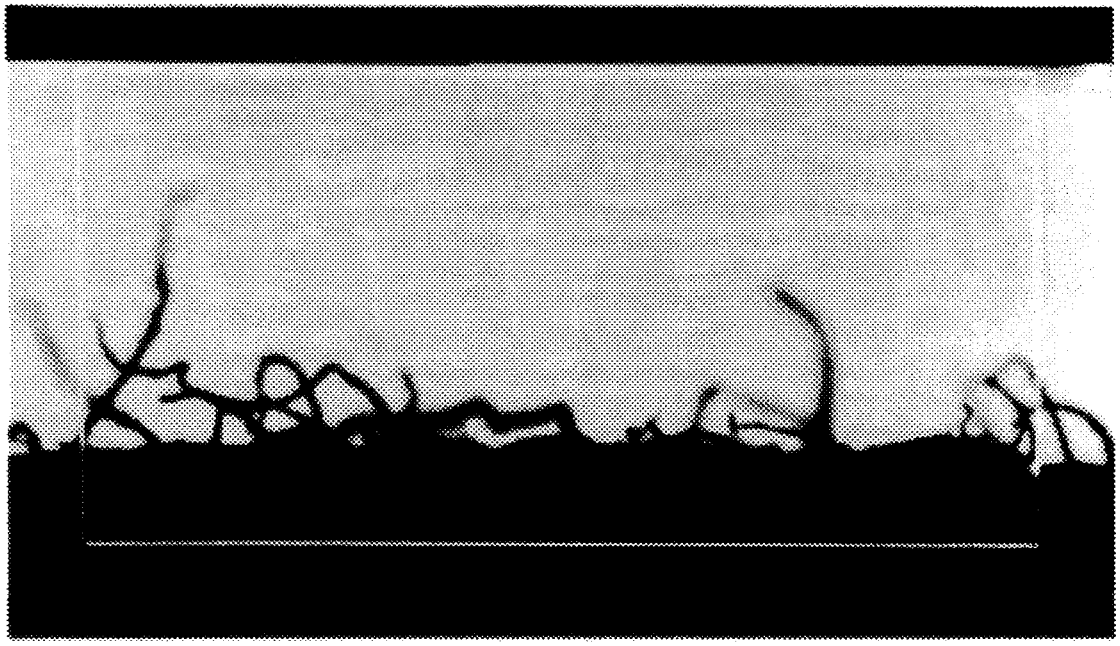
Figure 4:
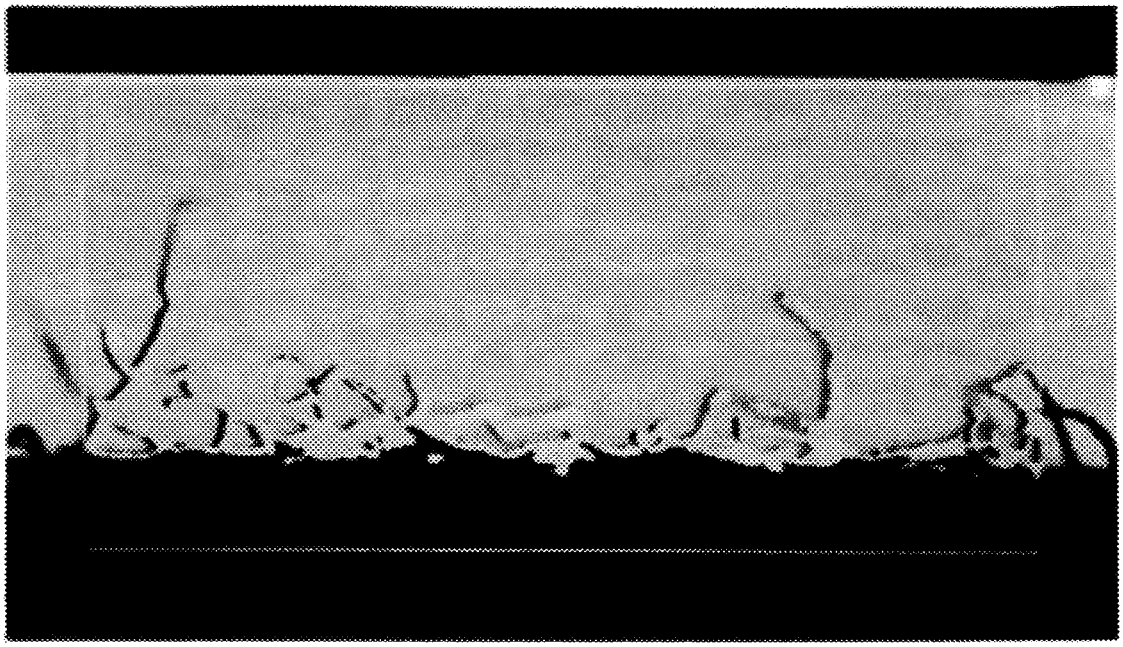

Referring to FIGS. 1A–1D, 2, 3 and 4, the sample preparation procedure for measuring the Profile Index will be described. In order to measure the Profile Index of a tissue, a sample 60 is cut to a dimension of one inch (machine direction) by three inches (cross-machine direction) and adhered to the side of a 0.1 mm thick, 22×40 mm glass coverslip 61 (No. 1, Corning Glass Works) using a strip of tape 62 as shown in FIG. 1A. The sample is then draped over the long edge of the glass slide such that the machine direction of the sample is perpendicular to the edge of the glass slide. The other end of the tissue sample is then adhered to the other side of the glass slide with a second strip of tape 63 as illustrated in cross-section in FIG. 1B. Bending the tissue over the slide exposes protruding fibers 64 (fiber size is greatly exaggerated for purposes of illustration) which are to be measured by the Profile Index. Two plain microslides 65 and 66 (1 mm thick, 25×75 mm) are then placed on both sides of the U-folded sample. The first microslide 65 is taped onto one side of the sample with tape 67 as shown in FIG. 1C. The second microslide 66 is taped to the sample and the first microslide with additional tape 68 as shown in FIG. 1D. This composite "sandwich" arrangement exposes protruding fibers along a linear edge of the tissue surface at the fold line of the sample. The composite is placed on a microscope stage in the path of transmitted light to view the exposed fold edge of the sample from the side. The prepared sample and resulting image appears generally as illustrated in FIG. 2. The image is then input to the Q-10 through the video camera. An actual photograph as viewed by the Q-10, magnified about 40×, is shown in FIG. 3. The area defined by the white box within the photograph is the measurement frame. FIG. 4 is the same as FIG. 3, except that the actual area detected by the Q-10 for measuring the Profile Index is highlighted in white.

In carrying out the Profile Index measurement, the specimen slide is placed on the microscopic stage such that the top of the field is clear and the bottom of the field is blocked by the sample on the slide. A measurement frame with dimensions of 1.2 mm in height and 2.6 mm in width are electronically placed around the image such that the tissue edge separating the slide from the clear field is very near to the bottom of this frame. The microscope is focused manually to give the sharpest contrast at the surface of the tissue edge. Individual fibers protruding from the edge are ignored during focusing to avoid biasing results. Next, the microscope illumination is adjusted so that the bright portions of the image (the clear part of the field) exhibit gray levels in the range of 52 to 56 (bright white has a gray level of 63). At this point, the solid dark regions of the image should be perfectly black (gray level zero). If this is not the case, the gain and offset of the analog-to-digital converter must be adjusted until both the dark and light grey levels are met. The test is then started over. (On the particular Q-10 image analyzer used for the Examples, the gain and offset were set to 15 and zero respectively. This equates to maximum gain and minimum offset. It must be noted that not all Q-10 image analyzers use the same analog-to-digital converter. These must be set to achieve the desired grey level range. Once the proper gain and offset are found, they will not need to be reset). Finally, the image is shade-corrected.

In order to calculate the Profile Index, several common image analysis functions are performed on the detected image. First, the image is thresholded or segmented. This step causes all pixels that have gray levels between approximately 2 and 45 to be identified. All other pixels are ignored. Following detection, all features (objects composed of contiguous identified pixels) less than three pixels in total width are eliminated. If done properly, these steps leave a single feature bounded by the outline of the specimen surface with all protruding fibers. The computer next measures the area of the feature(s) by counting the number of pixels identified. This area is composed of all pixels around the boundary of the specimen, up to the measurement and image frames. The area of all identified fibers/fibrils protruding away from the edge of the specimen in the plane of focus is included. When properly imaged and segmented, the image will appear as shown in FIG. 4.

The Profile Index is calculated as the difference between the identified area, as measured above, and the number of pixels a perfectly straight edge would form, divided by the number of pixels on said edge. An ideal imaging system would create a boundary of 512 pixels for such an edge. Experimentation has shown that the equipment used for this measurement doubles some pixels in a perfect boundary so that a sharp edge, on average, gives an area of about 650 pixels for a tissue web. To account for this, the Profile Index is calculated in accordance with the formula:

$$\text{Profile Index}=(\text{AREA}-650)/650.$$

wherein AREA is the pixel area identified by the Q-10. In order to accurately characterize a particular tissue sample, 52 different images are measured for individual Profile Index values and the 52 different Profile Index measurements are averaged.

EXAMPLES

Example 1

Milkweed Floss Fibers

In order to illustrate the improved softness obtained using low coarseness fibers, tissue sheets were made using the seed hairs or floss of the common milkweed plant (*Asclepias syriaca*). These fibers are the white, glossy fibers found within the milkweed seed pod which develops in late summer. These fibers have an extremely low Coarseness Index of about 3 or less due to their lightweight, hollow, thin-walled morphology. Because these fibers are naturally hydrophobic, slurrying them for papermaking required prior surface treatment with a nonionic surfactant (a 1% aqueous solution of Triton X100).

The surface-treated milkweed floss fibers were cut to an average length of about 1.5 mm and blended with hardwood or softwood kraft papermaking fibers to form an aqueous slurry. A tissue basesheet having a dry basis weight of 7.5 pounds per 2880 square feet was then made in a conventional manner on a laboratory scale continuous tissue-making machine operating at a speed of about 60 feet per minute. More specifically, the fiber furnish was wet laid onto a forming wire, dewatered, adhered to a Yankee dryer, dried, creped and wound onto a roll. The rolled tissue basesheet was then converted into two-ply tissue samples for testing. The results are illustrated in Table 1 below.

TABLE 1

| Furnish | Fiber Species Coarseness Index | Furnish Coarseness Index | Tensile[1] (GMT) | Softness | Profile Index | Absorbency |
|---|---|---|---|---|---|---|
| 100% NSK[2] | 11.2 | 11.2 | 650 | 7.0 | 2.33 | 8.7 |
| 85% NSK | 11.2 | 7.1 | 650 | 9.6 | 5.26 | 11.31 |
| 15% Milkweed | 2.3[3] | | | | | |
| 70% NSK | 11.2 | 5.2 | 560 | 10.2 | 5.16 | 12.24 |
| 30% Milkweed | 2.3 | | | (9.9)[4] | | |
| 50% NSK | 11.2 | 9.2 | 650 | 8.2 | 3.21 | 8.8 |
| 50% Eucalyptus | 7.8 | | | | | |
| 50% NSK | 11.2 | 10.6 | 640 | 8.2 | 3.76 | 8.4 |
| 50% NHK[5] | 10.0 | | | | | |
| 50% NSK | 11.2 | 6.9 | 500 | 10.2 | 4.88 | 11.04 |
| 35% NHK | 10.0 | | | 9.7[6] | | |
| 15% Milkweed | 2.3 | | | | | |

[1]GMT (Geometric Mean Tensile) = $\sqrt{\text{MDT} \times \text{CDT}}$ where MDT = the tensile strength (grams) of the web in the machine direction (MD) and CDT = the tensile strength (grams) of the web in the cross-machine direction (CD), expressed as grams.

[2]Northern softwood kraft fibers (average fiber length of 1.5 mm. using the Kajaani FS-100)

[3]Estimated values based on a Coarseness Index measurement of 3.6 obtained by the direct weighing method.

[4]Softness corrected to 650 GMT

[5]Northern hardwood kraft fibers (average fiber length of 0.6 mm. using the Kajaani FS-100)

[6]Softness corrected to 640 GMT

These results show the significantly increased softness, surface depth, and absorbency imparted to a tissue by the addition of milkweed floss fibers. As shown, it is not necessary to utilize large amounts of low coarseness fibers. In fact, because of cost considerations, blends with conventional furnish fibers are preferred. As illustrated by Table 1, the use of milkweed floss fibers at a level of only 15% provided a substantial softness improvement over a furnish blend containing 50% eucalyptus, which is the hardwood fiber species currently being used on a commercial basis to improve tissue softness over conventional hardwood/softwood blends. Preferred levels of milkweed floss fiber content are from about 5 to about 40 dry weight percent of the tissue product, more specifically from about 5 to about 30 dry weight percent, and still more specifically from about 5 to about 15 dry weight percent.

In the same manner as described in connection with the foregoing example, single-ply creped tissue having a dry basis weight of 14.5 pounds per 2880 square feet was made with two different furnishes, including 15 weight percent milkweed floss fiber. The results are as follows:

TABLE 2

| Furnish | Fiber Species Coarseness Index | Furnish Coarseness Index | Tensile (GMT) | Soft-ness | Profile Index |
|---|---|---|---|---|---|
| 50% NSK | 11.2 | 9.2 | 880 | −0.2 | 3.67 |
| 50% Eucalyptus | 7.8 | | | | |
| 85% NSK | 11.2 | 7.1 | 875 | 4.5 | 4.61 |
| 15% Milkweed | 2.3 | | | | |

Although *Asclepias syriaca* is a preferred seed hair fiber source, other seed hair-bearing milkweed species are also suitable low coarseness fiber sources, including, without limitation, *A.incarnata, A.curassavica, A.fruticosa, A.glaucophylla, A.semilunata,* and *A.subulata.*

Example 2

Abaca Fibers

As an example of a different low Coarseness Index fiber, two-ply tissue samples having a dry basis weight of 7.5 pounds per 2880 square feet per ply were prepared with abaca leaf fibers in a conventional manner on the laboratory scale tissue machine as described in Example 1, except that a preliminary surface treatment of the abaca fibers with surfactant was not necessary. The properties of the resulting two-ply tissue products are summarized in Table 3 below:

TABLE 3

| Furnish | Fiber Species Coarseness Index | Furnish Coarseness Index | Tensile (GMT) | Softness |
|---|---|---|---|---|
| 50% NSK | 11.2 | 10.6 | 1250 | 6.2 |
| 50% NHK[1] | 10.0 | | | |
| 20% Abaca | 8.4 | 9.2 | 1250 | 6.7 |
| 40% NSK | 11.2 | | | |
| 40% NHK | 10.0 | | | |

[1]Northern hardwood kraft fibers (average fiber length of 0.6 mm. using the Kajaani FS-100)

As illustrated, substituting abaca fibers for 10% of the hardwood fibers and 10% of the softwood fibers improved the softness from 6.2 to 6.7 at equal strengths.

In order to further illustrate the advantage of using abaca fibers, a handsheet study was conducted to measure the ratio between the dry tensile strength (GMT) and the specific modulus as an indicator of softness. In preparing handsheets for purposes of demonstrating the advantage of using low Coarseness Index fibers, it is necessary to avoid degradation of the fibers, particularly the grasses such as abaca. Hence the beating time and intensity of the furnish must be only as necessary to achieve good fiber distribution. The results are set forth below in Table 4.

TABLE 4

| Furnish | Coarse-ness Index | Furnish Coarseness Index | Tensile[1] | Modulus | Tensile/ Modulus Ratio |
|---|---|---|---|---|---|
| 100% NSK | 11.2 | 11.2 | 1192 | 146.5 | 8.14 |
| 75% NSK | 11.2 | 10.3 | 1590 | 177.9 | 8.94 |
| 25% Abaca | 8.4 | | | | |
| 50% NSK | 11.2 | 9.6 | 1959 | 198.4 | 9.87 |
| 50% Abaca | 8.4 | | | | |
| 25% NSK | 11.2 | 8.9 | 1976 | 199.4 | 9.91 |
| 75% Abaca | 8.4 | | | | |
| 100% Abaca | 8.4 | 8.4 | 2309 | 230.2 | 10.03 |

[1]Tensile strength for handsheets was only measured in one direction. All directions are expected to exhibit the same properties since there is no machine direction or cross-machine direction for handsheets. The same is true for the specific modulus.

The results of the handsheet study illustrate increasing Tensile/Modulus Ratio, and hence softness, with increasing abaca content. All of the foregoing data support the conclusion that the addition of low-Coarseness Index fibers (abaca fibers) to a furnish can provide measurable objective and subjective improvements to the softness of tissue products.

To further illustrate the advantage of using low-Coarseness Index fibers, additional two-ply tissue samples (7.5 pounds per 2880 square feet per ply) were prepared as described above. The results are summarized in Table 5.

TABLE 5

| Furnish | Fiber Species Coarseness Index | Furnish Coarseness Index | Tensile (GMT) | CD Modulus | CD Tensile/ CD Modulus Ratio | Softness |
|---|---|---|---|---|---|---|
| 40% NSK | 11.2 | 8.9 | 426[1] | 3.10 | 105.2 | 8.8 |
| 60% Eucalyptus | 7.8 | | | | | |
| 40% NSK | 11.2 | 8.9 | 601[1] | 4.30 | 101.4 | 8.4 |
| 60% Eucalyptus | 7.8 | | | | | |

TABLE 5-continued

| Furnish | Fiber Species Coarseness Index | Furnish Coarseness Index | Tensile (GMT) | CD Modulus | CD Tensile/ CD Modulus Ratio | Softness |
|---|---|---|---|---|---|---|
| 20% NSK | 11.2 | 8.4 | 496[3] | 1.93 | 163.7 | 9.2 |
| 20% Abaca | 8.4 | | | | | |
| 60% Eucalyptus | 7.8 | | | | | |

[1]MD Tensile = 557; CD Tensile = 326
[2]MD Tensile = 828; CD Tensile = 436
[3]MD Tensile = 779; CD Tensile = 316

The first and second samples of Table 5 are control samples representing conventional tissue products having the same furnish but differing strengths, due in part to differing levels of refining and wet strength additives. The third sample represents a tissue product in accordance with this invention, in which half of the NSK fibers were replaced with abaca fibers. The data illustrate an increase in softness attributable to the addition of the abaca fibers. The data also confirm the correlation between softness and the Tensile/Modulus Ratio for tissue.

Example 4

Pineapple Leaf Fibers

In order to further illustrate the softness benefit of using fibers of a species having a low average Coarseness Index, handsheets were prepared with different furnishes, including abaca and pineapple leaf fibers (average fiber length of about 1 to 2 millimeters), as set forth below in Table 6. In preparing handsheets for purposes of demonstrating the advantages of using low-Coarseness Index fibers for purposes of this invention, it is necessary to avoid degradation of the fibers, particularly the grasses such as abaca. Hence the beating time and intensity of the furnish must be only as necessary to achieve good fiber distribution.

TABLE 6

| Furnish | Fiber Species Coarseness Index | Furnish Coarseness Index | Tensile[1] | Modulus | Tensile/ Modulus Ratio |
|---|---|---|---|---|---|
| 50% Eucalyptus | 7.8 | 9.2 | 1649 | 174 | 9.5 |
| 50% NSK | 11.2 | | | | |
| 50% Eucalyptus | 7.8 | 8.1 | 2243 | 204 | 11.0 |
| 50% Abaca | 8.4 | | | | |
| 50% Eucalyptus | 7.8 | 5.4 | 2193 | 175 | 12.6 |
| 50% Pineapple | 4.1 | | | | |

[1]Tensile strength for handsheets was only measured in one direction. All directions are expected to exhibit the same properties since there is no machine direction or cross-machine direction for handsheets. The same is true for the elastic modulus.

These results clearly show a correlation of increasing Tensile/Modulus Ratio (softness) with decreasing Furnish Coarseness Index.

Example 5

Synthetic Fibers

In order to illustrate the usefulness of synthetic fibers in connection with this invention, handsheets having a basis weight of 11 pounds per 2880 square feet were prepared with a mixture of NSK fibers and synthetic fibers. The synthetic fibers were poly(ethylene terephthalate) (PET) fibers having a denier of 0.5 and a fiber length of 5 millimeters. The results are summarized below:

TABLE 7

| Furnish | Fiber Species Coarseness Index | Furnish Coarseness Index | Tensile | Modulus | Tensile/ Modulus Ratio |
|---|---|---|---|---|---|
| 100% NSK | 11.2 | 11.2 | 631 | 203.0[1] | 3.11 |
| 75% NSK | 11.2 | 4.3 | 1023 | 55.9 | 18.3 |
| 25% PET | 1.4[2] | | | | |

[1]Standard deviation = 63.76
[2]Measurement of the Coarseness Index on the Kajaani FS-100 required the use of denatured alcohol for all sample dilutions. In addition, the sample was diluted more than that used in the typical procedure - the final sample run on the Kajaani FS-100 was 0.00025 grams versus 0.001 grams.

These results further illustrate the improvement in softness achieved with synthetic fibers having a low Coarseness Index.

It will be appreciated that the foregoing examples, shown for purposes of illustration, are not to be construed as narrowing the scope of this invention, which is defined by the following claims.

We claim:

1. A tissue product comprising from about 5 to about 50 dry weight percent fibers selected from the group consisting of abaca leaf fibers, pineapple leaf fibers, and bast fibers from paper mulberry, said tissue product having a geometric mean tensile strength of about 500 grams or greater and an increased Tensile/Modulus Ratio compared to the same tissue product without any of said fibers.

2. The tissue product of claim 1 comprising from about 5 to about 50 dry weight percent abaca leaf fibers.

3. The tissue product of claim 1 comprising from about 5 to about 50 dry weight percent pineapple leaf fibers.

4. The tissue product of claim 1 comprising from about 5 to about 50 dry weight percent bast fibers from paper mulberry.

5. The tissue product of claim 2 wherein the Tensile/Modulus Ratio is 9.87.

6. The tissue product of claim 3 wherein the Tensile/Modulus Ratio is 12.6.

7. A tissue sheet comprising from about 5 to about 50 dry weight percent seed floss fibers of the genus Asclepias, wherein the seed floss fibers are cut to an average length of about 1.5 millimeters and the surfaces of the seed floss fibers are treated with a nonionic surfactant prior to forming the tissue sheet, said tissue sheet having a geometric mean tensile strength of about 500 grams or greater, an increased Tensile/Modulus Ratio compared to the same tissue sheet without any of said fibers, and an absorbent capacity greater than the absorbent capacity of the same tissue sheet without said fibers.

8. The tissue sheet of claim 7 wherein the surfactant-treated floss fibers are blended with softwood kraft fibers to form an aqueous slurry and wet laid onto a forming wire in a conventional manner.

9. The tissue sheet of claim 7 wherein the geometric mean tensile strength is attributable solely to the fibers in the sheet without the addition of strength additives.

10. The tissue sheet of claim 7 wherein the absorbency is 12.24 grams of water per gram of fiber.

* * * * *